United States Patent
Pattan

(10) Patent No.: US 9,288,118 B1
(45) Date of Patent: Mar. 15, 2016

(54) SETTING COOKIES ACROSS APPLICATIONS

(71) Applicant: Neha Gangadhar Pattan, Sunnyvale, CA (US)

(72) Inventor: Neha Gangadhar Pattan, Sunnyvale, CA (US)

(73) Assignee: Google Inc., Mountain View, CA (US)

(\*) Notice: Subject to any disclaimer, the term of this patent is extended or adjusted under 35 U.S.C. 154(b) by 206 days.

(21) Appl. No.: 13/759,797

(22) Filed: Feb. 5, 2013

(51) Int. Cl.
*G06F 15/173* (2006.01)
*H04L 12/24* (2006.01)
*H04L 29/08* (2006.01)
*H04L 29/06* (2006.01)

(52) U.S. Cl.
CPC ............... *H04L 41/28* (2013.01); *H04L 63/08* (2013.01); *H04L 67/02* (2013.01); *H04L 67/146* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 5,956,404 A | 9/1999 | Schneier et al. | |
| 6,917,976 B1 | 7/2005 | Slaughter et al. | |
| 7,010,808 B1 | 3/2006 | Leung et al. | |
| 7,383,289 B2 | 6/2008 | Kraft | |
| 7,389,530 B2 | 6/2008 | Raghunath et al. | |
| 7,421,730 B2 | 9/2008 | Walther et al. | |
| 7,669,052 B2 | 2/2010 | Asano et al. | |
| 7,873,734 B1 | 1/2011 | Eidelman et al. | |
| 7,877,461 B1 * | 1/2011 | Rimmer | 709/217 |
| 7,886,033 B2 | 2/2011 | Hopmann et al. | |
| 7,945,862 B2 * | 5/2011 | Aldrich et al. | 715/751 |
| 8,234,408 B2 | 7/2012 | Jungck | |
| 8,286,225 B2 | 10/2012 | Jakobsson | |
| 8,601,109 B2 | 12/2013 | Johannsen | |
| 8,736,427 B2 | 5/2014 | King | |
| 8,739,278 B2 | 5/2014 | Varghese | |
| 2002/0120666 A1 | 8/2002 | Landsman et al. | |
| 2002/0152393 A1 | 10/2002 | Thoma et al. | |
| 2003/0055870 A1 | 3/2003 | Smethers | |
| 2004/0208184 A1 | 10/2004 | Tanaka et al. | |
| 2004/0243466 A1 | 12/2004 | Trzybinski et al. | |
| 2005/0055269 A1 | 3/2005 | Roetter et al. | |
| 2006/0015405 A1 | 1/2006 | Bala et al. | |
| 2006/0072477 A1 | 4/2006 | Bodlaender | |
| 2006/0100928 A1 | 5/2006 | Walczak et al. | |
| 2006/0288209 A1 | 12/2006 | Vogler | |
| 2007/0174490 A1 | 7/2007 | Choi et al. | |
| 2007/0288317 A1 | 12/2007 | Gupta et al. | |
| 2008/0134345 A1 | 6/2008 | Epstein | |
| 2008/0183838 A1 | 7/2008 | Jain et al. | |
| 2009/0019153 A1 | 1/2009 | Sebastian | |
| 2009/0144159 A1 | 6/2009 | Bashyam | |
| 2009/0234708 A1 | 9/2009 | Heiser et al. | |
| 2009/0234711 A1 | 9/2009 | Ramer et al. | |
| 2009/0258637 A1 | 10/2009 | Liu et al. | |

(Continued)

OTHER PUBLICATIONS

"Tracking Methods for Mobile Application" prepared by the Mobile App Tracking Engineering Team, 2012 HasOffers, Inc., 6 pages.

(Continued)

*Primary Examiner* — Joshua Joo
(74) *Attorney, Agent, or Firm* — Foley & Lardner LLP; John D. Lanza

(57) ABSTRACT

Systems and methods for setting cookies across applications on a device include receiving a first cookie indicating authorization of a first application on the device to use an online account. A second cookie indicating that the first application is authorized to use the online account may be set in a second application on the device.

20 Claims, 9 Drawing Sheets

(56) References Cited

U.S. PATENT DOCUMENTS

| | | |
|---|---|---|
| 2009/0259855 A1 | 10/2009 | De Cesare et al. |
| 2009/0260064 A1 | 10/2009 | McDowell et al. |
| 2009/0300066 A1 | 12/2009 | Guo et al. |
| 2010/0115203 A1 | 5/2010 | White |
| 2010/0151831 A1 | 6/2010 | Hao et al. |
| 2011/0093920 A1 | 4/2011 | Etchegoyen |
| 2011/0153411 A1 | 6/2011 | Levav et al. |
| 2011/0185016 A1 | 7/2011 | Kandasamy et al. |
| 2011/0252150 A1 | 10/2011 | Chandrabasu et al. |
| 2011/0295678 A1 | 12/2011 | Seldin et al. |
| 2011/0321167 A1 | 12/2011 | Wu et al. |
| 2012/0017094 A1 | 1/2012 | Tulchinsky et al. |
| 2012/0030369 A1 | 2/2012 | Lamba et al. |
| 2012/0066767 A1 | 3/2012 | Vimpari |
| 2012/0311171 A1 | 12/2012 | Holley et al. |
| 2013/0212188 A1* | 8/2013 | Duterque et al. ............ 709/206 |
| 2014/0129712 A1* | 5/2014 | Sharp ............................ 709/225 |

OTHER PUBLICATIONS

Barth, A., and U.C. Berkley. "HTTP State Management Mechanism (RFC 6265)." Internet Engineering Task Force (IETF), Apr. (2011).

Cloud Connect Google Apps, Google Help Center, Nov. 7, 2012—url accessed Mar. 4, 2015: http://web.archive.org/web/20130313070509/https://developers.google.com/search-appliance/documentation/68/help_gsa/cloud_google_apps, 6 pages.

Fielding, R., et al. "RFC 2616." Hypertext Transfer Protocol-HTTP/1.1 2.1 (1999): 2-2.

Gutzmann, Kurt. "Access control and session management in the HTTP environment." Internet Computing, IEEE 5.1 (2001):26-35.

Serving Front Ends, Google Help Center, url accessed Mar. 4, 2015: http://www.google.com/support/enterprise/static/gsa/docs/admin/72/admin_console_help/serve_frontends.html, 2 pages.

* cited by examiner

SETTING COOKIES ACROSS APPLICATIONS

BACKGROUND

Online content may be available regarding any number of disparate topics. For example, a first website on the Internet may be devoted to the migratory habits of bats and a second website may be devoted to automotive repair. In many cases, a user must proactively seek out online content of interest to the user. For example, an Internet user may utilize a search engine to search for webpages devoted to automotive repair. The user may then navigate between the webpages in the search results until the user finds the webpage that most closely matches the user's interests.

To assist a user in receiving content of potential interest to the user, an online service may select certain types of content for presentation to the user. For example, a webpage devoted to automotive repair may include an advertisement for a sale on car parts selected by the online service. In some cases, the selection process may be based on data stored through the use of a device identifier, such as a cookie, that identifies the user's device to the service. However, a cookie set on the device via one application may not be accessible by other applications on the device. For example, a cookie set in a web browser application may not be available to other applications on the same device and vice-versa. The service, therefore, may select different content for presentation in the web browser than for the other applications. It is challenging and difficult to design a system whereby cookies are set across applications.

SUMMARY

Implementations of the systems and methods for setting cookies across applications are described herein. One implementation is a computerized method of setting a cookie on a device. The method includes receiving, at a processor, a content selection request from a first application executing on the device, the content selection request including a first cookie indicating an authorization of the first application to use an online account. The method also includes selecting, in response to the content selection request, third-party content for presentation within the first application, the third-party content selected based in part on information associated with the online account. The method further includes providing an indication of the selected third-party content to the first application on the device. The method yet further includes receiving, at the processor via a second application on the device, interaction data indicating an interaction with the third-party content within the first application and including the first cookie. The method also includes setting a second cookie in the second application based on a determination that the interaction data does not include the second cookie, the second cookie indicating authorization of the first application to use the online account.

Another implementation is a system for setting a cookie on a device. The system includes a processor operable to receive a content selection request from a first application executing on the device, the content selection request including a first cookie indicating authorization of the first application to use an online account. The processor is also operable to select, in response to the content selection request, third-party content for presentation within the first application, the third-party content selected based in part on information associated with the online account. The processor is further operable to provide an indication of the selected third-party content to the first application executing on the device. The processor is also operable to receive, via a second application on the device, data indicating interaction with the third-party content within the first application and including the first cookie. The processor is further operable to set a second cookie in the second application based on a determination that the interaction data does not include the second cookie, the second cookie indicating authorization of the second application to use the online account.

A further implementation is a computer-readable storage medium having machine instructions stored therein, the instructions being executable by a processor to cause the processor to perform operations. The operations include receiving a content selection request from a first application executing on the device, the content selection request including a first cookie indicating authorization of the first application to use an online account. The operations also include selecting, in response to the content selection request, third-party content for presentation within the first application, the third-party content selected based in part on information associated with the online account. The operations further include providing an indication of the selected third-party content to the first application executing on the device. The operations yet further include receiving, via a second application on the device, data indicating interaction with the third-party content within the first application and including the first cookie. The operations additionally include setting a second cookie in the second application based on a determination that the interaction data does not include the second cookie, the second cookie indicating authorization of the second application to use the online account.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
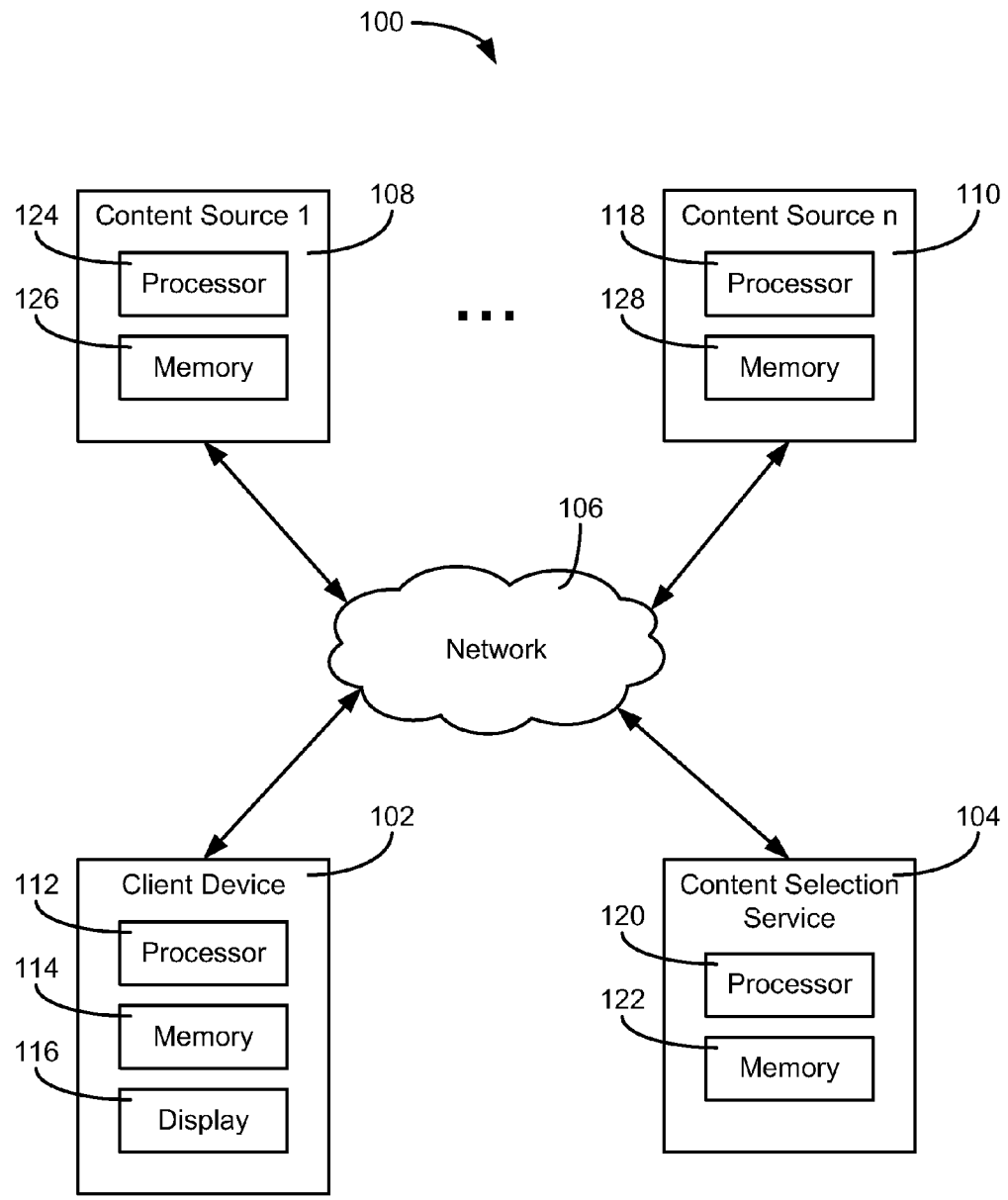
FIG. 1 is a block diagram of a computer system in accordance with a described implementation.

According to some aspects of the present disclosure, a client device may receive first-party and third-party content for presentation to a user. As used herein, first-party content refers to the primary online content requested by a client device. For example, first-party content may be a webpage requested by the device or the primary content presented to the user as part of a stand-alone application (e.g., a video game, a chat program, etc.). Third-party content, in contrast, refers to additional content that may be provided in conjunction with the first-party content. For example, third-party content may be a public service announcement or an advertisement that appears in conjunction with a requested webpage (e.g., a search result webpage from a search engine, a webpage that includes an online article, a webpage of a social networking service, etc.) or within a stand-alone application (e.g., an advertisement within a game, a messaging program, a navigation program, etc.). Generally, a first-party content provider refers to any content provider that allows another content provider (i.e., a third-party content provider) to provide content in conjunction with that of the first-party provider. The first-party content provider may or may not be compensated for allowing a third-party provider to provide content with the first-party provider's content. For example, the first-party provider may receive compensation for allowing certain paid public service announcements or advertisements to be provided in conjunction with the first-party provider's content.

A first-party content provider may allow a content selection service to determine which third-party content is to be provided in conjunction with the first-party provider's content. One or more third-party content providers may also use the content selection service to provide third-party content in conjunction with content from any number of first-party providers. In some cases, the content selection service may dynamically select which third-party content is presented in conjunction with a first-party provider's content. For example, a first-party webpage may display different advertisements selected by the service during different visits to the webpage.

According to various implementations, a content selection service may employ a number of different techniques to select third-party content of interest to a user. Under a first approach, the content selection service may select third-party content based solely on the topic or nature of the first-party content. For example, a golf-related advertisement may be selected for display on a golf-related webpage or within a golf-related application. Under a second approach, the content selection service may use device identifiers, with the user's permission, to create a history of the content presented by the device and any actions performed with respect to the content (e.g., which webpages were visited by the device, whether certain content was clicked by the user, etc.). This history may be analyzed to identify potential interests of the user, which can be used by the content selection service to select the third-party content. For example, a golf-related advertisement may be presented to a user on a webpage unrelated to golf, if the user previously visited a number of golf-related webpages (e.g., if the user's web surfing habits indicate an interest in golf). This approach provides more insight into the user's potential interests, but still lacks information about the user's true disposition towards a topic. For example, the user may not actually like golf, but instead be doing online research into how golf courses negatively impact the environment. Under a third approach, information about the user's disposition towards a topic may be garnered from an online account of the user. For example, a user may provide information about herself as part of her online account (e.g., her interests, location, demographics, etc.), which may be used by the contents selection service to select content for the user. Typically, this approach offers the greatest insight into who the user is and what her interests are, since much of the information is supplied directly by the user.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by a content selection service and presented to the user. Certain data, such as a device identifier (e.g., a cookie, a hardware-based device identifier, etc.), may be anonymized in one or more ways before it is stored or used, so that personally identifiable information is removed when generating parameters (e.g., demographic parameters) used by the content selection service to select third-party content. For example, a device identifier may be anonymized so that no personally identifiable information about its corresponding user can be determined from it. In another example, a user's geographic location may be generalized where location information is obtained (such as to a city, ZIP code, or state level), so that a precise location of the user cannot be determined. Thus, the user may have control over how information is collected about him or her and used by the content selection service.

In some implementations, another measure that may be taken by a content selection service to ensure a user's privacy is by only utilizing a user's account information to select third-party content when the user is logged into the account. In some implementations, a "logged-in" cookie may be set in an application running on a client device that identifies the device as being logged into a particular online account. When the user of the device logs out of the account, the cookie may be modified (e.g., by changing the value of the cookie), deactivated, or removed from the device. Content selection requests sent by the application to the content selection service may include the logged-in cookie, to notify the service that the device is logged into an online account and that information from the account can be used to select third-party content for the device. If the content selection request does not include the logged-in cookie, the content selection server may use alternate techniques to select the third-party content, such as basing the selection on a topic of the first-party content with which the selected content will be presented, using a "logged-out" cookie or other identifier to determine a history of webpage visits, etc.

Applications on a device may have different cookie spaces which may not be shared with one another. Also known as a cookie jar, a cookie space generally refers to the set of cookies available to a particular application or set of related software utilities. Thus, a first application on a device may have a different set of cookies than a second application on the device. In one example, a mobile application on a device may have a first cookie space and a web browser application on the same device may have a different cookie space. Since the cookie spaces are not shared, cookies set in the mobile application are not available to the web browser application and vice-versa. For example, a logged-in cookie used by a content selection service set in the application's cookie space would not be available to the web browser application. According to implementations described herein, various techniques are disclosed that allow corresponding cookies to be set across different applications of the same device, such as cookies indicative of the device being logged into an online account.

Referring to FIG. 1, a block diagram of a computer system 100 in accordance with a described implementation is shown. System 100 includes a client device 102 which communicates with other computing devices via a network 106. Client device 102 may execute a web browser or other application (e.g., a video game, a messenger program, a media player, a social networking application, a navigation program, etc.) to retrieve content from other devices over network 106. For example, client device 102 may communicate with any number of content sources 108, 110 (e.g., a first content source through nth content source). Content sources 108, 110 may provide webpage data and/or other content, such as images, video, audio, or an application to client device 102. Computer system 100 may also include a content selection service 104 configured to select third-party content to be provided to client device 102. For example, content source 108 may provide a first-party webpage to client device 102 that includes additional third-party content selected by content selection service 104.

Network 106 may be any form of computer network that relays information between client device 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be of any number of different types of user electronic devices configured to communicate via network 106 (e.g., a laptop computer, a desktop computer, a tablet computer, a smartphone, a digital video recorder, a set-top box for a television, a video game console, combinations thereof, etc.). Client device 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other content received from content sources 108, 110, and/or third-party content selected by content selection service 104.

Content sources 108, 110 may be one or more electronic devices connected to network 106 that provide content to client device 102. For example, content sources 108, 110 may be computer servers (e.g., FTP servers, file sharing servers, web servers, etc.) or a combination of servers (e.g., data centers, cloud computing platforms, etc.). Content may include, but is not limited to, webpages, audio data, video data, and other forms of data files (e.g., spreadsheets, text files, images, etc.). Similar to client device 102, content sources 108, 110 may include processing circuits having processors 124, 118 and memories 126, 128, respectively, that store program instructions executable by processors 124, 118. For example, the processing circuit of content source 108 may include instructions such as web server software, FTP serving software, and other types of software that cause content source 108 to provide content via network 106.

In some implementations, one or more of content sources 108, 110 may allow a user of client device 102 to maintain an online account for a service provided by the content source. Exemplary services that may employ accounts include, but are not limited to, services that restrict access to content (e.g., a user may be required to have an account to access certain web articles, games, video or audio content, etc.), social networking services, communication services (e.g., services that allow users to communicate via email, instant message, videoconference, VOIP, etc.), content sharing services (e.g., services that allow users to share images, recommend content to others, etc.), navigation services (e.g., services that provide maps, driving directions, etc.), and file storage services (e.g., services that allow users to store electronic files remotely, such as cloud storage services). In some implementations, an account may be used to access any number of different services provided by content sources 108, 110. In some implementations, a web browser application on client device 102 may be used to access an account and any associated services provided by content sources 108, 110. In other implementations, client device 102 may execute a stand-alone application to access an online account and associated services provided by content sources 108, 110. For example, client device 102 may execute a stand-alone social networking application that accesses a social networking service provided by content source 108.

Similar to content sources 108, 110, content selection service 104 may be one or more electronic devices connected to network 106 that selects third-party content to be presented by client device 102 to a user. Content selection service 104 may include a computer server (e.g., an FTP server, file sharing server, web server, etc.) or a combination of servers (e.g., a data center, a cloud computing platform, etc.). Content selection service 104 may include a processing circuit including a processor 120 and a memory 122 that stores program instructions executable by processor 120. According to various implementations, content selection service 104 may be configured to select third-party content for presentation with first-party content on client device 102 based on a topic of the first-party content, a history of online actions performed by client device 102, or an online account associated with client device 102 (e.g., an online account being accessed by client device 102).

Content selection service 104 may select third-party content for client device 102 in response to receiving a content selection request from client device 102 via network 106. An application on client device 102 may send a content selection request to content selection service 104 periodically, randomly, or in response to a specific event occurring (e.g., the user has streamed n-number of songs in the application, the user has reached a new level in a game, etc.). A web browser application may also send a content selection request to content selection service 104 in response to executing a content tag embedded in a first-party webpage being accessed by client device 102. In general, a content tag may be any piece of webpage code associated with presenting third-party content with a first-party webpage (e.g., embedded in the webpage, in a pop-up window, etc.). A content tag may also define whether the third-party content should be loaded asynchronously or synchronously, whether the loading of the third-party content should be disabled on the webpage, whether the third-party content that loaded unsuccessfully should be refreshed, the network location of a server that selects the third-party content (e.g., content selection service 104), a network location (e.g., a URL) associated with clicking on the third-party content, how the third-party content is to be rendered on a display, one or more keywords used to select the third-party content, and other functions associated with providing third-party content on a first-party webpage.

In some implementations, content selection service 104 may set a cookie, with the user's permission, within an application of client 102 to identify and store history data relating to client device 102. Such a cookie may contain no personally identifiable information about the user and be used by content selection service 104 to identify client device 102. For example, a first-party webpage visited by client device 102 may include a content tag that cause client device 102 to send a content selection request to content selection service 104. Such a request may include the cookie and the address of the first-party webpage. Content selection service 104 may store the cookie, a timestamp, and the address of the webpage as part of history data for the cookie. In some implementations, content selection service 104 may analyze the content of the webpages accessed by the cookie to identify topics of the visited webpages. The identified topics may then be used by content selection service 104 to generate an interest category profile associated with the cookie. For example, if the cookie's history data includes a large number of visits to golf-related webpages, its associated interest category profile may include the interest category of golf. When content selection service 104 receives a content selection request that includes the cookie, it may select third-party content based on the cookie's associated interest category profile (e.g., by selecting a golf-related advertisement) or other information determined by analyzing the webpages visited by the cookie.

In further implementations, a logged-in cookie may be set in an application on client device 102 that indicates that the application is logged into an online account managed by one of content sources 108, 110. In some implementations, a logged-in cookie may be set on client device 102 via a content tag embedded in a webpage being accessed using the account. In other implementations, a logged-in cookie may be set by a stand-alone application accessing a service of content sources 108, 110 via the account. A content selection request from client device 102 may also include the logged-in cookie, thereby notifying content selection service 104 that client device 102 is logged into the account. In such a case, content selection service 104 may select third-party content for client device 102 based on information available from the account. If the content selection request also includes a cookie used to store history data about client device 102 may also be used as part of the selection process (e.g., an interest category associated with the cookie, etc.). To distinguish between a logged-in cookie and a cookie used to generate history data unassociated with the account, the latter is referred to henceforth as a "logged-out" cookie, since its associated data may be used by content selection service 104 to select third-party content regardless of whether client device 102 is logged into an account.

Content selection service 104 may provide an indication of the selected third-party content to client device 102 or either of content sources 108, 110, according to some implementations. In some implementations, content selection service 104 may provide an instruction to client device 102 that causes client device 102 to retrieve the selected third-party content from memory 114 or from either of content sources 108, 110. In other implementations, the indication of the selected third-party content provided to client device 102 may itself include the third-party content. In a further implementation, content selection service 104 may notify either of content sources 108, 110 of the selection (e.g., by sending the third-party content directly or by sending an identifier for the selected content). In such a case, content sources 108, 110 may embed the selected third-party content directly into the first-party content served by content sources 108, 110.

Figure 2:
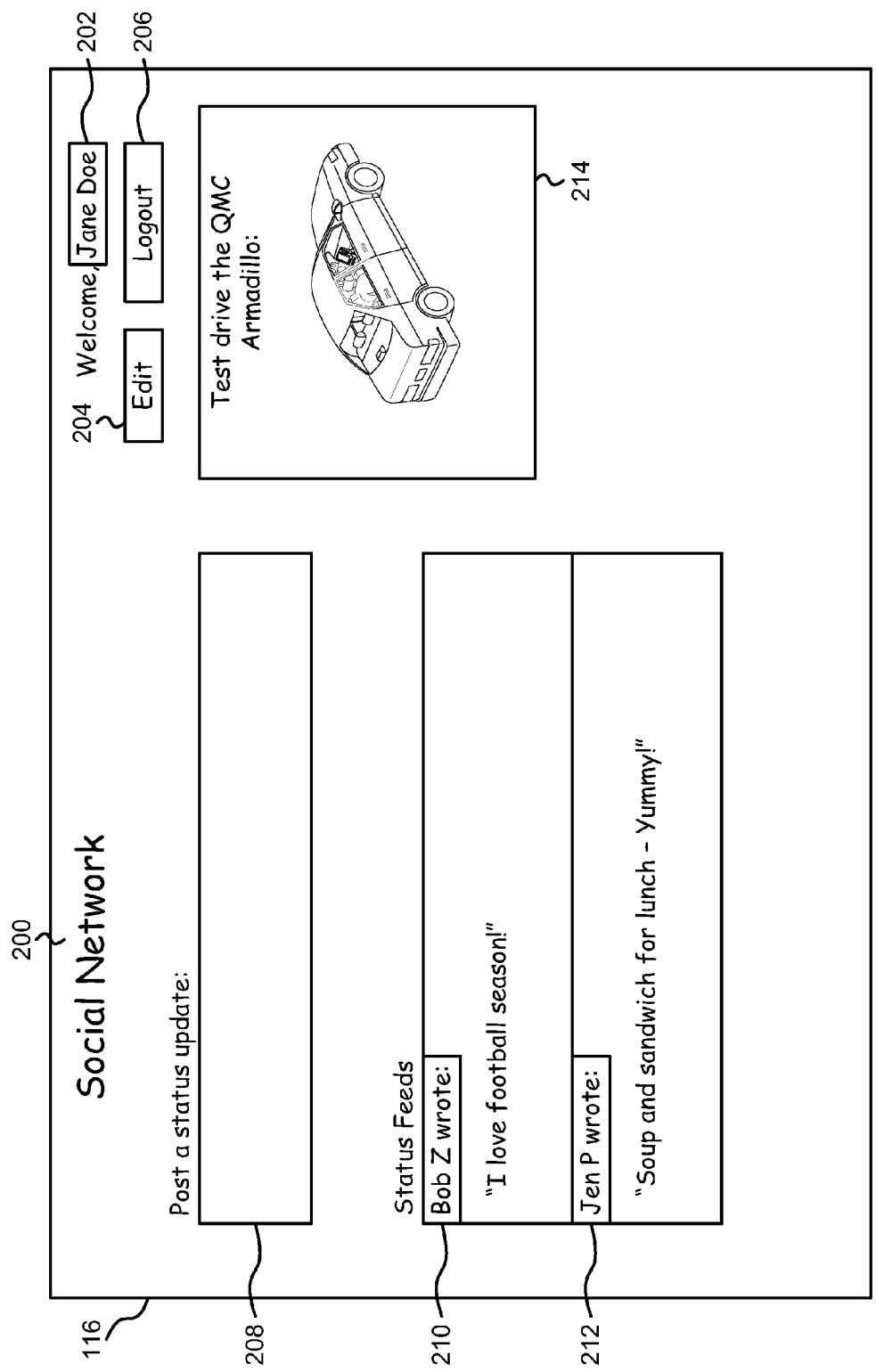
FIG. 2 is an illustration of an electronic display showing an exemplary interface to an online service.

Referring now to FIG. 2, an illustration is shown of electronic display 116 displaying an exemplary interface 200 to an online service, according to various implementations. In the example shown, the online service is a social networking service. However, an interface to any other form of online service (e.g., a navigation service, a file sharing service, etc.) may be provided to display 116 in a similar manner as interface 200, in other implementations.

In some implementations, interface 200 may be provided to display 116 by a stand-alone application executing on client device 102. The stand-alone application may include the logic for interface 200. For example, the layout of a particular screen in interface 200 may be hardcoded into the application. First-party content may then be requested by the application and displayed within the hardcoded layout of interface 200. For example, the stand-alone application may include the logic to display a social connection's avatar (e.g., an image) and to request the avatar from a content source of the accessed service (e.g., from content source 108). In response to receiving the image data from the content source, the stand-alone application may display the image in a corresponding area of the displayed interface 200.

In other implementations, interface 200 may be provided via a website of the online service being accessed by client device 102. For example, the online service may have a website that provides webpage data to a web browser application executing on client device 102, in response to receiving a request for the data from the web browser. The received webpage data may include data regarding the layout of interface 200, any content associated with the service to be presented as part of interface 200, as well as any logic associated with interacting with the service via interface 200. For example, the webpage data may include the images and text that appear as part of interface 200. The webpage data may also include any number of scripts which may be run by the web browser to interact with the online service via interface 200. For example, a received script may be configured to allow a user of client device 102 to upload a photograph to the content source via interface 200.

As shown, interface 200 displayed on display 116 may include first-party data provided to client device 102 by a content source of the online service. For example, interface 200 may include status updates 210, 212 uploaded to the content source by social connections of the user of client device 102. Similarly, interface 200 may include a field 208 configured to allow the user of client device 102 to upload a status update to the service. The uploaded status update may then be disseminated by the service to the devices of the user's social connections.

The service associated with interface 200 may allow users accessing the service to create accounts with the service. In some implementations, an account may be required by the service to access some or all of the first-party content provided by the service. For example, a user of a social networking service may only be able to view other users' profiles if he or she also has an account with the service. In other implementations, an account may be required by the service to perform certain actions. For example, the social networking service may allow a user without an account to view other users' profiles, but only allow the user to post a status update if he or she has an account with the service. In a further implementation, the service may grant an account holder additional privileges, such as discounts, additional storage space on the service, or the like. An account holder with the online service may pay for the account or may receive it for free by the service.

To access an account, the service may require some form of authentication via interface 200. For example, interface 200 may require a user to enter a username (e.g., a screen name, email address, etc.) and password, to access the user's account. Interface 200 may also require the user to answer a number of security questions before logging the user into the account (e.g., to verify the user's identity). In some cases, the service may also limit the devices that may access the account. For example, the service may send a special code to a user's mobile phone and require the code to be entered via interface 200, before allowing the user access to the account. In the example shown, the user Jane Doe has logged into her account via interface 200, as indicated by field 202. Interface 200 may also include an option 206 configured to log the user out of the account when selected.

Interface 200 may include an option 204 configured to allow the user of client 102 to edit the user's account. When selected, the user may supply information about him or herself and stored as part of the account. The account may further include information regarding some or all of the account's activities within the service. For example, account information may include data regarding content rated via the account, social networking groups joined by the account, content uploaded to the service via the account, social connections of the account, and other similar data. The user may also set account preferences for the service via option 204, such as display preferences for interface 200 and privacy preferences for the service. For example, the user may select option 204 to elect to hide his or her information from certain social connections on the service.

In some implementations, interface 200 may include third-party content 214 selected by a content selection service, such as content selection service 104. The content selection service may select content 214 in response to receive a content selection request from client device 102. In one example, interface 200 may be a webpage that includes one or more content tags (e.g., an embedded script, an instruction, etc.) that cause client device 102 to send the content selection request. In another example, a stand-alone application providing interface 200 to display 116 may include instructions that cause client device 102 to send the content selection request. For example, the stand-alone application that provides interface 200 may be a mobile application written in part using a software development kit (SDK) provided by the operator of the content selection service. The SDK may, for example, include the logic of the stand-alone application that causes it to request third-party content. The provider of interface 200 may or may not be compensated when third-party content 214 is included in interface 200, in various implementations.

Third-party content 214 may be selected by the content selection service in any number of different ways. In some implementations, the content selection service may select content 214 based on the first-party content being displayed on display 116 (e.g., the selection service may identify a displayed topic using text or image recognition). For example, a social connection's status feed mentioning automobiles or the QMC Armadillo may result in third-party content 214 being selected. In other implementations, a logged-out cookie may be sent as part of a content selection request and used to select third-party content 214. For example, the logged-out cookie may indicate that client device 102 visited a number of websites devoted to automobiles. In a further implementation, third-party content 214 may be selected based in part on account information for the logged-in account. For example, a content selection request may include a logged-in cookie notifying the content selection service that client device 102 is currently logged into the account in the social networking service. The content selection service then may use data related to the account to select third-party content 214. For example, the account information may include data regarding the account holder joining an interest group devoted to automobiles.

Third-party content 214 may be interactive, in some implementations. For example, third-party content 214 may be selectable (e.g., third-party content 214 includes a hotlink that directs client device 102 to a particular website when selected) or playable (e.g., third-party content 214 includes audio or video that may be played in interface 200). In another example, third-party content 214 may be configured to include a hover-over effect, such as displaying additional information in a popup window if a cursor is positioned over third-party content 214. In some implementations, an indication of an interaction with third-party content 214 may be sent by client device 102 to the content selection service. For example, the content selection service may charge an advertiser each time the advertiser's third-party content is clicked at a user's device.

Figure 3:
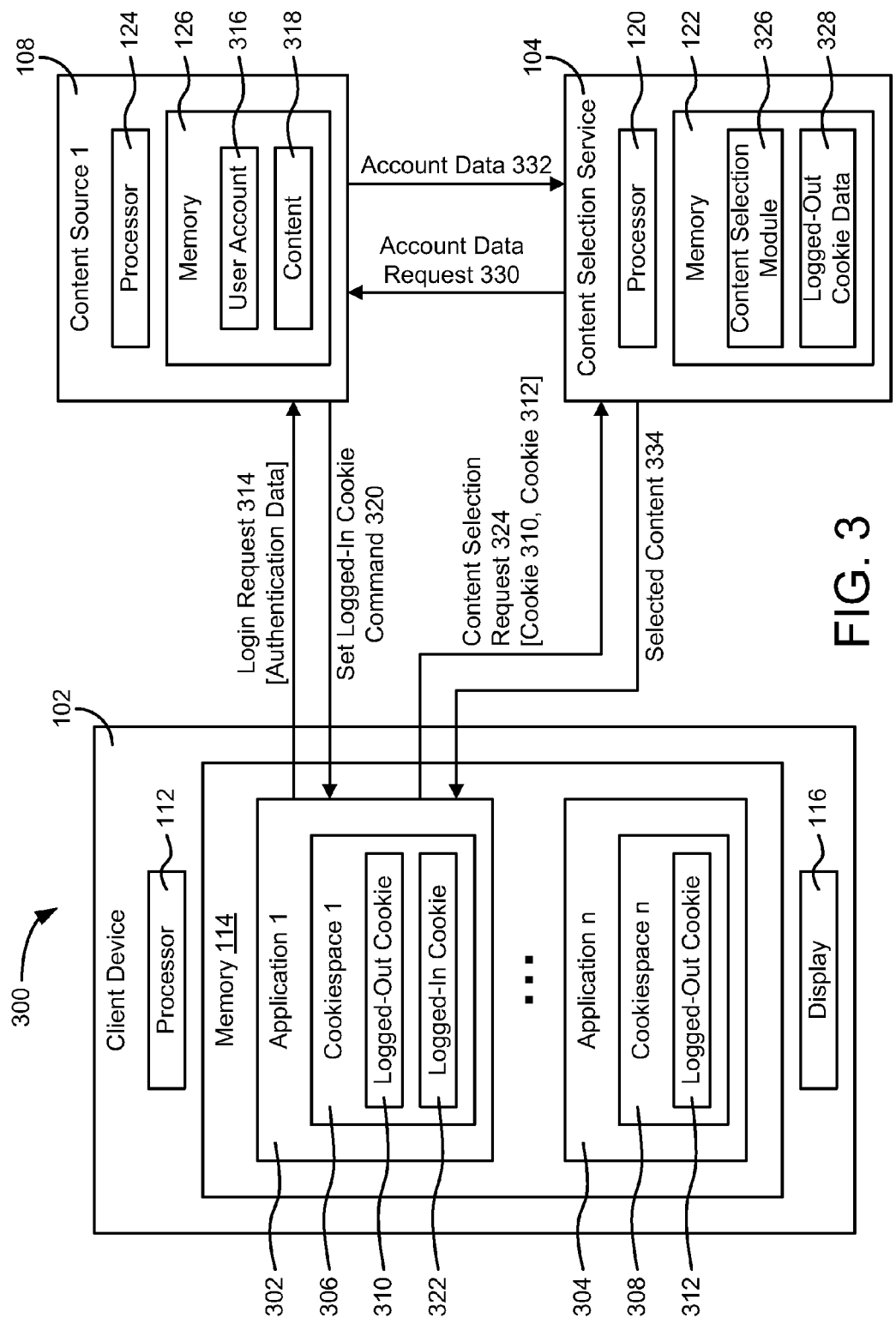
FIG. 3 is an example illustration of third-party content being selected for a first application.

Referring now to FIG. 3, an example illustration 300 is shown of third-party content being selected for a first application, according to one implementation. As shown, client device 102 may execute any number of applications stored in memory 114 (e.g., a first application 302 through an nth application 304). In some implementations, application 302 may be a stand-alone application configured to provide an interface to an online service of content source 108 (e.g., a social networking service, a file sharing service, a navigation service, etc.), while application 304 is a web browser. For example, application 304 may provide interface 200 to display 116 when executed, as shown in FIG. 2.

Each of applications 302-304 may have its own cookie space. For example, application 302 may have a cookie space 306 and application 304 may have a cookie space 308. In some implementations, cookies stored in one application's cookie space may be available to some applications an unavailable to other applications. For example, certain mobile applications on client device 102 may share cookies with one another, but not with a web browser application on client device 102. As shown, cookie space 306 may be unavailable to application 304 and cookies stored in cookie space 308 may be unavailable to application 302. Thus, a cookie set via the web browser application 304 on client device 102 may be inaccessible to application 302. As shown, each of cookie spaces 306, 308 may include a logged-out cookie (e.g., logged-out cookies 310, 312, respectively). Logged-out cookies 310, 312 may be set in their respective applications to identify client device 102 to content selection service 104. For example, logged-out cookie 312 may be sent to content selection service 104 as part of a content selection request, whenever web browser application 304 visits a first-party webpage that includes third-party content selected by content selection service 104.

In some implementations, logged-out cookie 310 may be a cookie set in application 302 by content selection service 104 to globally identify client device 102. For example, logged-out cookie 310 may include a global identifier that may be copied by application 302 to a common utility on client device 102, such as a clipboard utility. Other stand-alone applications on client device 102 may then use the global identifier when setting their own corresponding logged-out cookie. Whenever content selection service 104 receives a content selection request from such an application, the cookie containing the global identifier may also be included in the request, thereby allowing content selection service 104 to uniquely identify client device 102. Content selection service 104 may maintain a counter to ensure that the global identifier is only being used by one device. If multiple devices are using the same global identifier, a new global identifier may be generated by content selection service 104 and set on client device 102. However, some applications on client device 102, such as web browser application 304, may not be configured to access the shared utility.

As shown, stand-alone application 302 may send a log-in request 314 to content source 108 to log into a user account 316. Log-in request 314 may include authentication data, such as a login name, password, or other forms of authentication data. Content source 108 may validate the authentication data by comparing it to authentication data stored as part of user account 316. If the authentication matches, application 302 may be logged into the online service and used to access first-part content 318. According to various implementations, content source 108 may send a command 320 to client device 102 configured to cause a logged-in cookie 322 to be set in cookie space 306. In some implementations, command 320 may cause application 302 to send an indication to content selection service 104 that application 302 is logged into account 316. In response, content selection service 104 may set logged-in cookie 322 in application 302. In other implementations, command 320 may cause application 302 to set logged-in cookie 322 directly. Logged-in cookie 322 may include an identifier for user account 316 (e.g., a hashed identifier for user account 316), in various implementations.

During use, application 302 may send a content selection request 324 to content selection service 104. Content selection request 324 may include logged-out cookie 310 and/or logged-in cookie 322, if application 302 is logged into account 316. Content selection service 104 may include a content selection module 326 configured to analyze content selection request 324 and select third-party content for client 102. In some implementations, content selection module 326 may use logged-out cookie 310 to retrieve associated logged-out cookie data 328 from memory 122. Logged-out cookie data 328 may be any form of data gathered using logged-out cookie 310 that may be used as part of the selection by content selection module 326. In general, logged-out cookie data 328 may include any data not associated with account 316.

If content selection request 324 includes logged-in cookie 312, content selection module 326 may retrieve data associated account 316 to be used as part of the content selection. In some implementations, content selection module 326 may send a request 330 for account data to content source 108. Request 330 may include an identifier for account 316. In response, content source 108 may return account data 332 to content selection module 326. In other implementations, account data 332 may already be stored in memory 122 and retrieved by content selection module 326 using logged-in cookie 312. Account data 332 may include any data related to account 316 that may be used by content selection module 326 to select third-party content for client device 102. For example, account data 332 may include information supplied by the account holder, information regarding actions performed using account 316 in the online service of content source 108, and any other information related to account 316 (e.g., activities of social connections of account 316, content uploaded by social connections of account 316, etc.).

Content selection module 326 may use account data 332 and/or logged-out cookie data 328 to select third-party content for presentation within application 302 on client device 102. For example, account data 332 may indicate that account 316 was used to positively rate golf-related content. Based on this, content selection module 326 may select third-party content related to golf for presentation by application 302. Content selection module 326 may provide an indication of the selected third-party content 334 to application 302. Indication 330 may include a command that causes application 302 to retrieve the selected third-party content or may itself be the selected third-party content, in various implementations.

Figure 4:
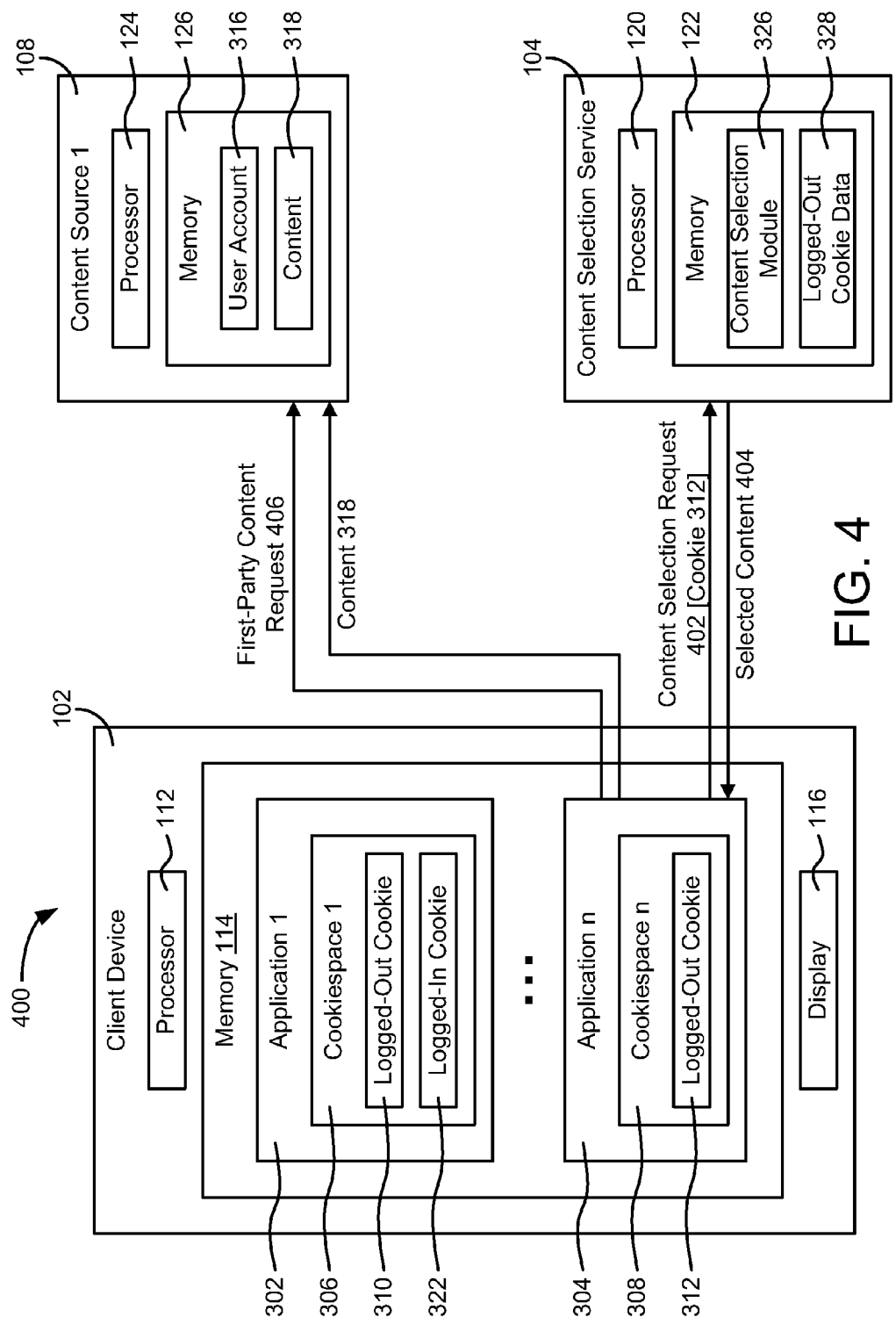
FIG. 4 is an example illustration of a second application sending a content selection request.

Referring now to FIG. 4, an example illustration 400 of a second application sending a content selection request is shown, according to one implementation. As shown, web browser application 304 may send a request 406 for first-party content to a web server, such as content source 108. In response, content source 108 returns first-party content 318 to web browser application 304 for presentation on display 116. First-party content 318 may also include a content tag configured to cause web browser application 304 to send a content selection request 402 to content selection service 104.

In the example shown, assume that application 302 is logged into account 316 and has a corresponding logged-in cookie 322. However, web browser application 304 does not have a corresponding logged-in cookie, since it does not have access to cookie space 306 of application 302. In such a case, content selection request 402 may only include logged-out cookie 312 set in web browser application 304. Content selection module 326 may match logged-out cookie 312 to logged out cookie data 328 and use logged out cookie data 328 to select third-party content 404. Content selection module 326 may then provide an indication 404 of the selected third-party content to web browser application 304.

Figure 5:
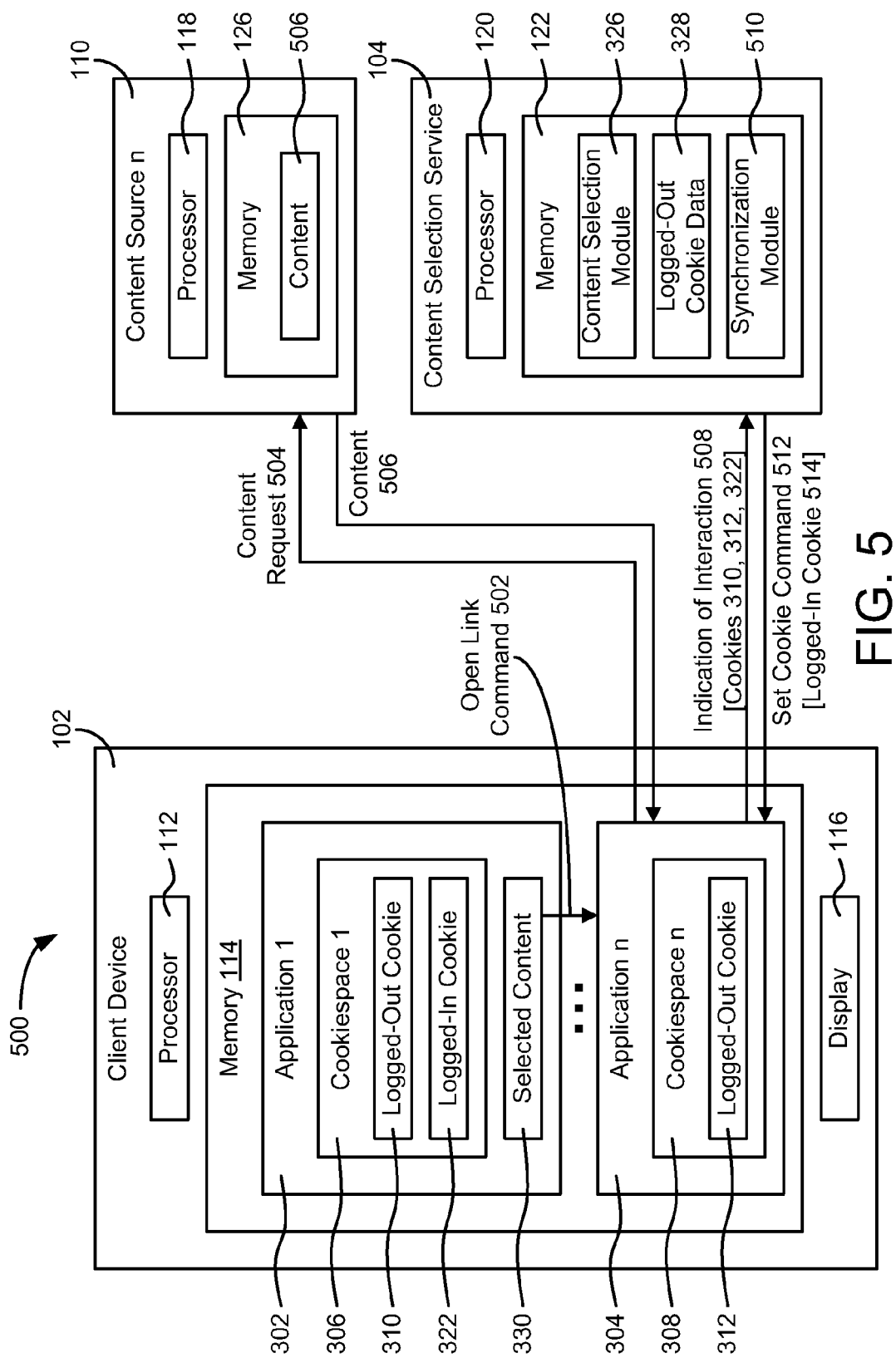
FIG. 5 is an example illustration of a logged-in cookie being set in a second application.

Referring now to FIG. 5, an example illustration 500 of a logged-in cookie being set in a second application is shown, according to various implementations. Continuing the example of FIG. 3, assume that logged-in cookie 322 has been set in application 302 to indicate to content selection service 104 that client device 102 is logged into account 316 on content source 108. Also, assume that third-party content 334 has been selected by content selection service 104 and is being presented within application 302 on display 116.

In some implementations, third-party content 334 may be interactive. For example, third-party content 334 may be hot-linked to a webpage served by content source 110. In some implementations, a user clicking on third-party content 334 may cause application 302 to send an open link command 502 to web browser application 304. Open link command 502 may cause web browser application 304 to send a content request 504 to a content source (e.g., content source 110) for a first-party webpage. In response, content source 110 may return the requested content 506 to web browser application 304 for presentation on display 116. For example, third-party content 334 may be an advertisement hotlinked to the advertiser's website (e.g., a website served by content source 110). Thus, a user clicking on the advertisement within application 302 may cause web browser application 304 to launch and navigate to the advertiser's website.

Open link command 502 may also cause web browser application 304 to provide an indication 508 of the content interaction to content selection service 104. For example, content selection service 104 may record the number of times third-party content 334 was clicked at different devices. Indication 508 may include cookies 310, 312, or 322, in some implementations. For example, logged-in cookie 322 may be provided to content selection service 104 as part of indication 508 if application 302 is logged into account 316.

According to various implementations, content selection service 104 also includes a synchronization module 510. Synchronization module 510 is configured to synchronize logged-in cookies across applications 302-304 on client device 102. In some implementations, synchronization module 510 may determine whether indication 508 includes logged-in cookie 322 and a corresponding logged in cookie set in web browser application 304. If no such logged-in cookie is set in web browser application 304, content selection service 104 may send a set cookie command 512 to web browser application 304 that causes the application to set a logged-in cookie 514. Logged-in cookie 514 may have the same value as logged-in cookie 514 or a different value, in various implementations. In general, logged-in cookie 514 may include an identifier for account 316, thereby indicating that web browser application 304 is logged into account 316 on content source 108. According to various implementations, content selection service 104 may not store logged-in cookies and, consequently, any way to link client device 102 to account 316 unless client device 102 is currently logged into account 316.

Figure 6:
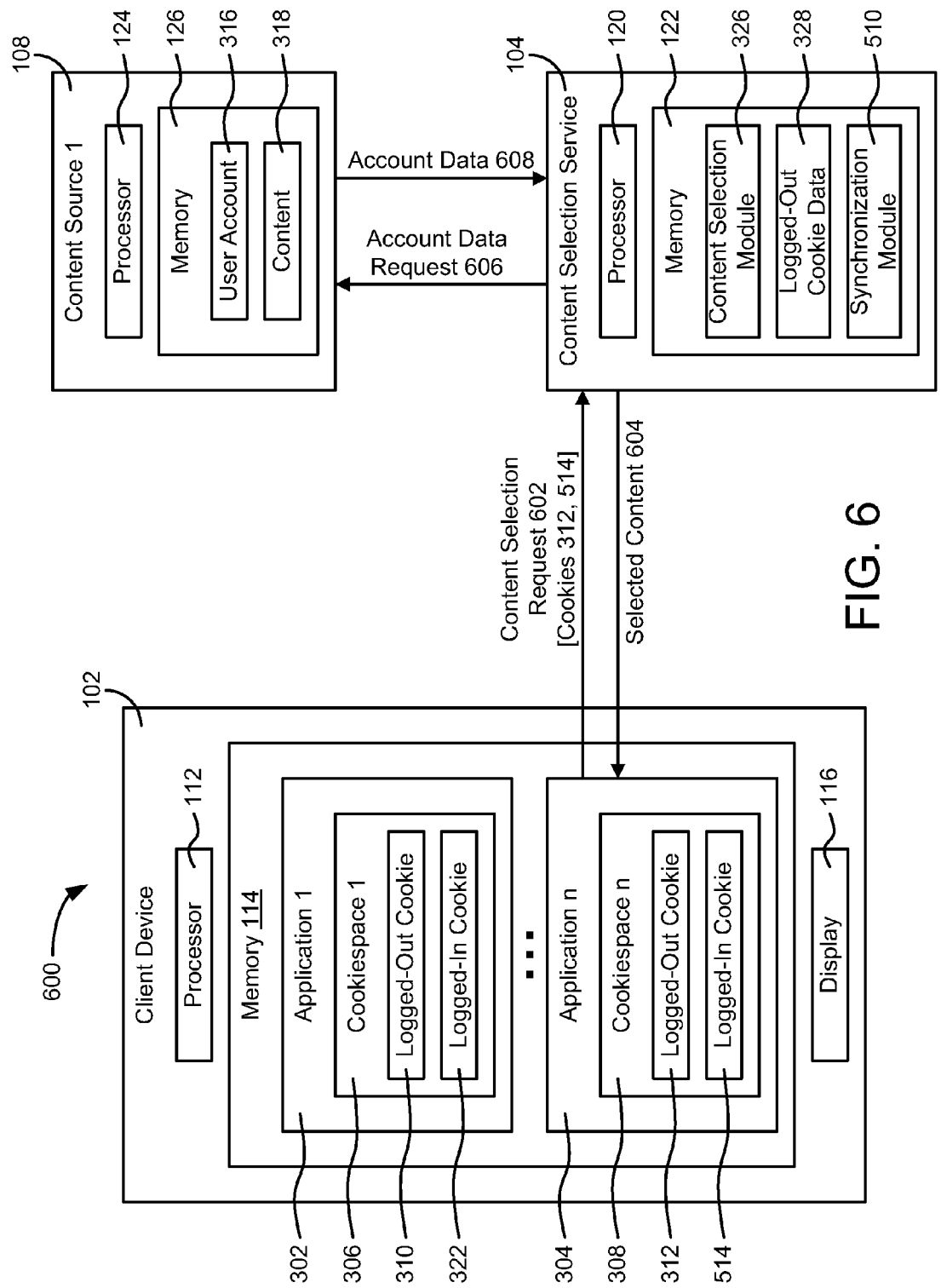
FIG. 6 is an example illustration of the logged-in cookie set in a second application being used to select third-party content.

Referring now to FIG. 6, an example illustration 600 is shown of a cookie set in a second application being used to select third-party content, according to some implementations. Similar to the example shown in FIG. 4, web browser application 304 may request first-party content (e.g., a webpage) from a content source. The first-party content may also include instructions that cause web browser application 304 to send a content selection request 602 to content selection service 104 for third-party content to be included on the webpage. In contrast to the example shown in FIG. 4, however, content selection request 602 may include both of cookies 312, 514. Since logged-in cookie 514 is included in content selection request 602, content selection module 326 may base its selection in part on information associated with account 316. In response to receiving logged-in cookie 514, content selection module 326 may retrieve the account information from content source 108 or locally from memory 122. For example, content selection module 326 may send an account data request 606 to content source 108 for information regarding account 316. In response, content source 108 may send account data 608 to content selection module 326.

Content selection module 326 may select third-party content based on account data 608 and/or logged-out cookie data 328. For example, content selection module 326 may base the selection in part on topics of webpages visited by web browser application 304 using logged-out cookie 312. Content selection module 326 may also base the selection in part on information in account data 608 (e.g., topics or other information self-identified by the account tholder, potential interests of social connections of the account holder, etc.).

Figure 7:
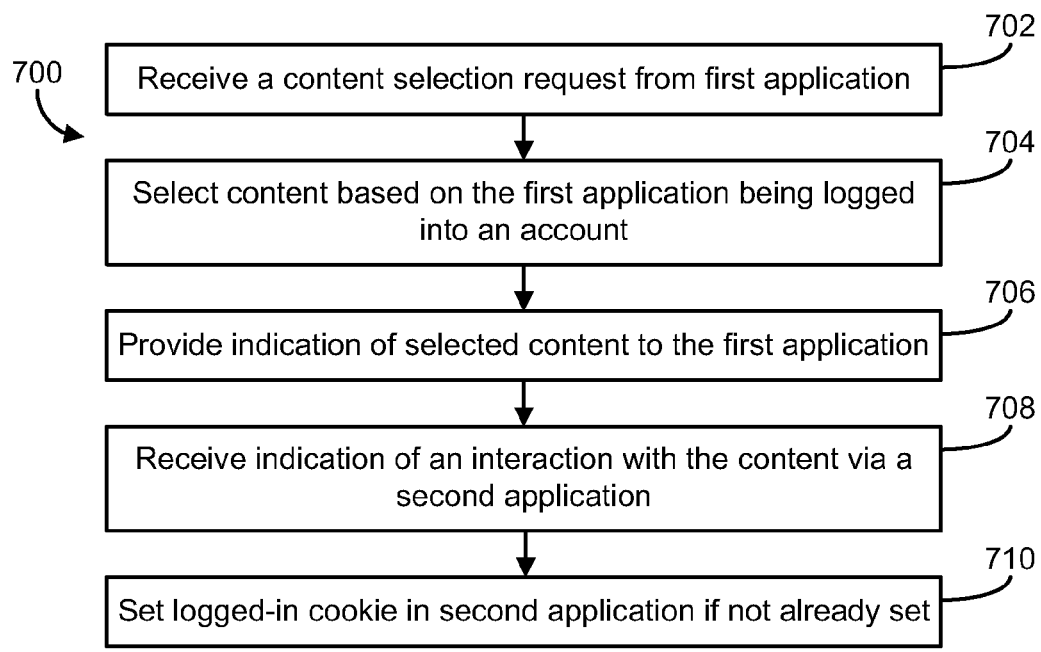
FIG. 7 is a flow diagram of a process for setting cookies across applications, according to an exemplary implementation.

Referring now to FIG. 7, a flow diagram of a process 700 for setting cookies across applications is shown, according to an exemplary implementation. In general, process 700 enables corresponding logged-in cookies to be set across applications on the same device. Process 700 may be implemented by any number of computing devices. For example, process 500 may be implemented by a content selection service, such as content selection service 104 shown in FIG. 1. In another example, process 700 may be implemented by a content selection service working in conjunction with one or more content sources (e.g., a social networking server, another web server, etc.) or other devices.

Process 700 includes receiving a content selection request from a first application on a device (block 702). In various implementations, the first application is a stand-alone application configured to provide an interface for an online service. For example, the first application may be a mobile application configured to access an online email service, an online social networking service, an online navigation service, etc. In some implementations, the content selection request may include a logged-in cookie configured to indicate that the application is logged into an online account. In further implementations, the content selection request may include a logged-out cookie configured to identify the device or application to the content selection service in addition to, or in lieu of, a logged-in cookie. For example, the logged-out cookie may be used by the content selection service to store a history of online actions performed via the application that are not associated with an account.

Process 700 includes selecting third-party content based in part on the first application being logged into an account (block 704). In cases in which a received content selection request includes a logged-in cookie associated with an online account, data associated with the account may be used to select the third-party content for presentation within the first application. Data associated with an account may include, but is not limited to, information supplied by the account holder, content accessed via the account (e.g., webpages, video, images, etc.), content uploaded via the account (e.g., messages, images, video, etc.), social networking actions (e.g., sharing content, rating content, joining a group devoted to a topic, etc.), searches performed via the account (e.g., searches for driving directions, web searches, etc.), and actions performed via other accounts socially connected to the account (e.g., activities of the account holder's friends, family, co-workers, etc.). In some implementations, the selection may be based on a topic identified using text or image recognition. For example, text recognition may be used on a message posted via an account to determine a topic of the message or a disposition towards the topic (e.g., the message is favorable towards the topic of sport utility vehicles, the message is negative towards the topic of golf, etc.). Third-party content having the same topic or a related topic may then be selected. In further implementations, other factors that may affect the selection include topics identified using a logged-out cookie and the results of a content auction in which third-party content providers compete for the ability to provide third-party content within the first application.

Process 700 includes providing an indication of the selected third-party content to the first application on the device (block 706). In some implementations, the indication may itself be the third-party content. For example, a content selection service may provide an automobile-related advertisement to the device for presentation within the first application. In other implementations, the indication may include an instruction or location at which the application can retrieve the selected third-party content. In one example, the selected third-party content may have already been downloaded to the device. In such a case, the content selection service may cause the first application to retrieve the third-party content from local memory instead of the service re-sending the third-party content to the device. In another example, the content selection service may cause the first application to retrieve the selected third-party content from another networked device. For example, the indication from the content selection service may cause the first application to retrieve the selected third-party content from a remote web server or FTP server.

In various implementations, the third-party content selected for presentation within the first application on the device may be interactive content (e.g., the content is playable, the content is hotlinked to a webpage, etc.). For example, the third-party content selected for presentation within the first application may be an advertisement configured to cause the device to navigate to the advertiser's website when clicked. In another example, the third-party content may be a video that may be played when a play button is clicked. In a further example, the third-party content may have a hover over effect that causes additional information to be displayed when a cursor is placed above the content.

Process 700 includes receiving an indication of an interaction with the third-party content via a second application on the device (block 708). Interactive third-party content presented within the first application on the device may be configured to notify the content selection service or another related service of an interaction with the content. For example, the content selection service may be notified when the third-party content is clicked within the first application. According to various implementations, the indication of the interaction may be sent via a second application on the device. In some implementations, the first application may be a stand-alone application (e.g., an application configured to access a particular online service, such as a social networking service, email service, navigation service, etc.) and the second application may be a web browser application. In such a case, the web browser application may notify the content selection service or another related service that an interaction took place with the third-party content. For example, a user clicking on third-party content within the stand-alone application may cause the web browser to launch and navigate to the third-party content provider's website. A content tag on the third-party content provider's website or the stand-alone application itself may also cause the web browser to send a notification to the content selection service that the third-party content was clicked.

According to various implementations, the indication of the content interaction may include, but is not limited to, a logged-out cookie set within the first application, a logged-out cookie set within the second application, a logged-in cookie set within the first application (e.g., a cookie indicating that the first application is logged into a particular account), or a logged-in cookie set within the second application (e.g., a cookie indicating that the second application is logged into a particular account). For example, a user may be logged into her account for a social networking service through a stand-alone application on her device and also through a web frontend via a web browser application on her device. In such a case, the stand-alone application and the web browser may each have a logged-in cookie indicative of the user being logged into her social networking account.

Process 700 includes setting a logged-in cookie in the second application, if it has not already been set (block 710). According to various implementations, the indication of the interaction with the third-party content may be analyzed to determine whether it includes a logged-in cookie for the first application and a corresponding cookie for the second application. In cases in which the indication includes a logged-in cookie for the first application, but not a corresponding logged-in cookie for the second application (e.g., a web browser), the service receiving the indication may cause a logged-in cookie to be set in the second application. In some implementations, the service may return an HTTP set cookie command to the second application. In other implementations, the service may return a value that causes a script or other program on the device to set a logged-in cookie in the second application. For example, a logged-in cookie may be set in a web browser via a Javascript script. As a result, the logged in state of the first application on the device may be reflected within the second application by setting a corresponding cookie in the second application.

Figure 8:
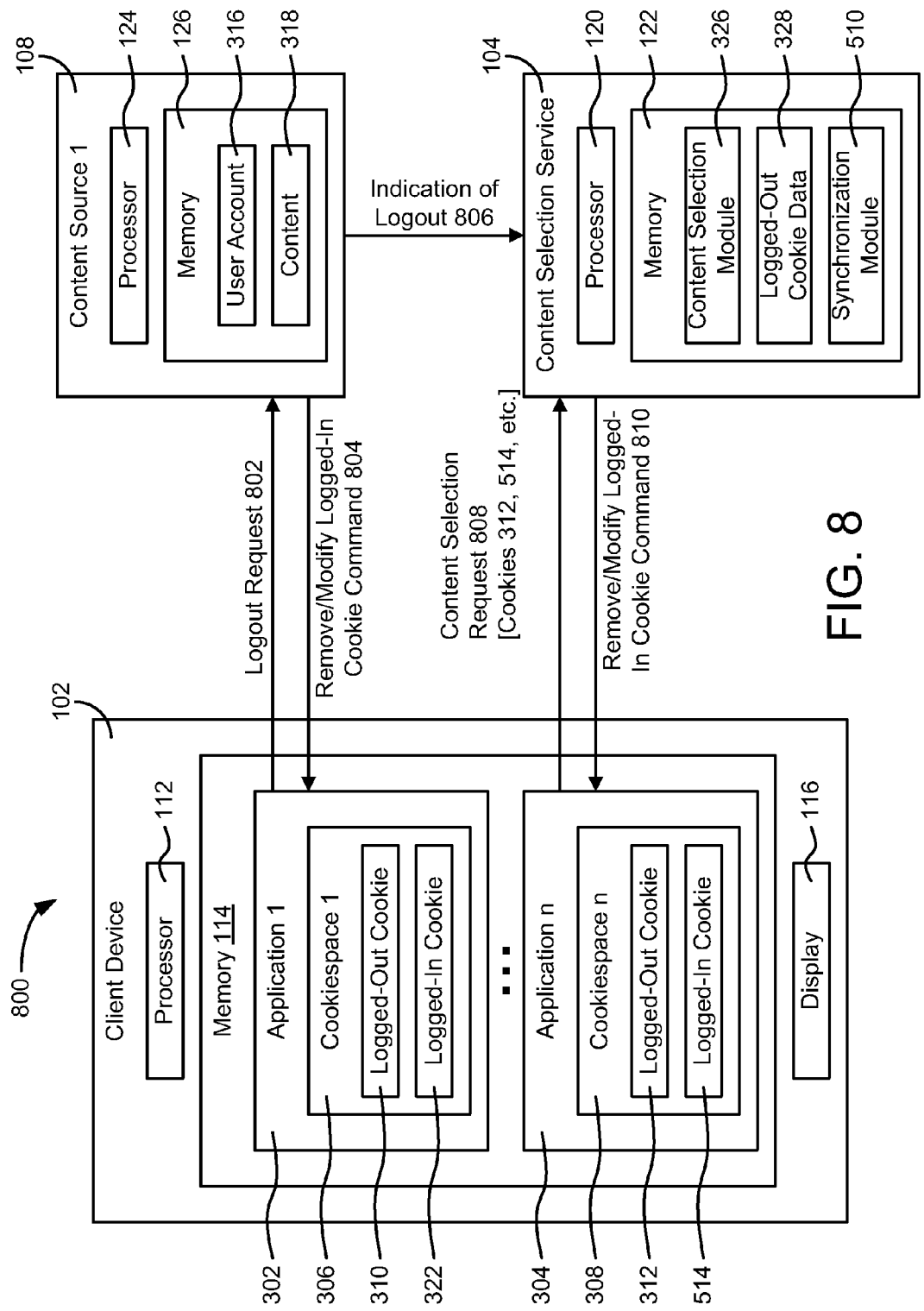
FIG. 8 is an example illustration of a logged-out state being synchronized across applications on a device.

Referring now to FIG. 8, an example illustration 800 is shown of a logged-out state being synchronized across applications on a device, according to various implementations. As shown, application 302 may eventually log out of account 316 on content source 108. For example, the user of client device 102 may log out of her social networking account after use. In some implementations, application 302 may send a logout request 802 to content source 108 to log application 302 out of account 316.

In some implementations, content source 108 may send a command 804 to application 302 on client device 102 that causes client device 102 to remove or modify logged-in cookie 322. In other implementations, command 804 may be generated within application 302 in conjunction with logout request 802 being generated. For example, command 804 may cause application 302 to delete logged-in cookie 322, either via an HTTP command or via a script or other code executed by application 302. In some implementations, command 804 may cause application 302 to notify content selection service 104 that application 302 is logged out of account 316. In response, content selection service 104 may remove or modify logged-in cookie 322. In some implementations, logged-in cookie 322 may be removed by setting its expiration date or time to be prior to the current date and time. In response, application 302 may delete or deactivate logged-in cookie 322. In other implementations, the value of logged-in cookie 322 may be modified such that it indicates that application 302 is not logged into account 316. For example, the value of logged-in cookie 322 may be zeroed or set to an arbitrary value uncorrelated to account 316. In another example, a particular bit or set of bits in the value of logged-in cookie 322 may be used to signify whether application 302 is logged into account 316. Such a bit may then be toggled to indicate that application 302 is not currently logged into account 316.

As shown in illustration 800, content source 108 may provide an indication 806 to content selection service 104 indicative of application 302 having logged out of account 316. Indication 802 may include a device identifier that uniquely identifies client device 102. For example, indication 806 may include logged-out cookie 306 or another identifier for client device 102, such as an identifier based on one or more unique hardware serial numbers (e.g., the MAC address of client device 102, etc.). In some implementations, indication 806 may also include additional data regarding application 302, such as the online service being accessed via account 316 or an identifier for account 316 itself. For example, indication 806 may correspond to a notification that a social networking application (e.g., application 302) has logged out of account "A" in the "XYZ" social networking service. In response to receiving indication 806, content selection service 104 may store the received device identifier in memory 122 to record that application 302 is logged out of account 316.

While application 302 is logged out of account 316, application 304 may still provide third-party content selected by content selection service 104 to display 116. For example, assume that web browser application 304 is used to visit a webpage that includes a content tag associated with content selection service 104. While loading the webpage, web browser application 304 may send a content selection request 808 to content selection service 104, to select third-party content for presentation with the webpage. According to various implementations, content selection request 808 may include logged-out cookie 312, logged-in cookie 514, or any other cookies set in web browser application 304. Content selection request 808 may also include a device identifier for client device 102 (e.g., a hardware-based identifier, logged-out cookie 312, or the like).

In various implementations, synchronization module 510 may compare the device identifier for client device 102 stored in memory 122 to the device identifier included with content selection request 808. If the two device identifiers match, synchronization module 510 may synchronize the logged out state of application 302 with application 304. In other words, content selection service 104 may store an indication that application 302 on client device 102 is logged out of account 316. Synchronization module 510 may analyze content selection request 808 to determine whether it contains logged-in cookie 514. In some implementations, synchronization module 510 may determine that applications 302, 304 are already synchronized based on content selection request 808 not containing logged-in cookie 514. In further implementations, logged-in cookie 514 may include one or more bits or have other associated data that indicates that application 302 is still logged into account 316. In such a case, synchronization module 510 may send a command 810 to application 304 that causes application 304 to remove or modify logged-in cookie 514, to indicate that client device 102 is logged out of account 316. In a further implementation, logged-in cookie 514 may be configured to indicate multiple states of client device 102. For example, logged-in cookie 514 may indicate a first state corresponding to application 302 being logged into account 316, a second state corresponding to both applications 302, 304 being logged into account 316, or a third state corresponding to application 304 being logged into account 316. If logged-in cookie 514 indicates that application 302 is logged into account 316 and content selection service 104 received indication 806, synchronization module 510 may analyze logged-in cookie 514 to assess the current state of client device 102 and issue command 810 to application 304 (e.g., to modify cookie 514 to reflect a different state, to deactivate logged-in cookie 514, to delete logged-in cookie 514, etc.).

Figure 9:
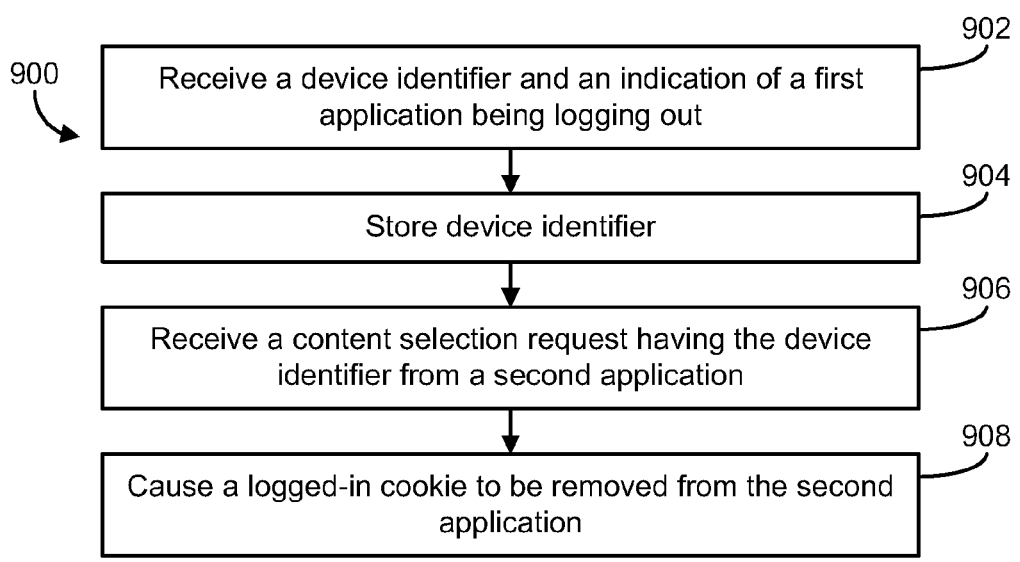
FIG. 9 is a flow diagram of a process for synchronizing logged-out states across applications, according to an exemplary implementation.

Referring now to FIG. 9, a flow diagram of a process 900 for synchronizing logged-out states across applications is shown, according to various implementations. Generally, process 900 enables a logged-in cookie set in a second application on a device to be removed or disabled, if a first application on the device logs out of a corresponding account. Process 900 may be implemented by any number of computing devices, such as content selection service 104 shown in FIG. 1. In various implementations, process 900 may be implemented in conjunction with process 700 to both set and remove logged-in cookies across applications on a device.

Process 900 includes receiving an indication that a first application on a device has logged out of an account and an identifier for the device (block 902). In some implementations, the indication may be received from the service accessed by the account. For example, the indication may be received by a social networking service if the first application is used to log out of an account on the service. In other implementations, the indication may be received by the device itself. For example, the first application may also send an indication to a content selection service that the first application is being used to log out of the account.

In various implementations, the device identifier may be a universal identifier for the device (e.g., an identifier that identifies the device regardless of the application being used at the time). In some implementations, the device identifier may be a hardware-based identifier. For example, the device identifier may be based on a hardware serial number, such as a MAC address, or a combination of hardware serial numbers. The device identifier may also be based on a serial number within the operating system of the device. In further implementations, the device identifier may also be set across applications using a common utility, such as a clipboard. In some implementations, the device identifier may itself be a cookie, such as a logged-out cookie.

Process 900 includes storing the device identifier (step 904). In response to receiving the indication that the first application has been logged out of the account, the device identifier may be stored to synchronize the logged-out state across other applications on the device. The device identifier may be stored with or without additional data, according to various implementations. For example, the device identifier may be stored in a table devoted to recording which devices are currently in a logged-out state. In another example, the device identifier may be stored with other associated data, such as an identifier for the account (e.g., if the device is used to access multiple accounts), a timestamp of the logout, or any other data regarding the logout.

Process 900 includes receiving a content selection request from a second application on the device (block 906). The content selection request may include the device identifier (e.g., a logged-out cookie or similar identifier) and a logged-in cookie, if one has been set in the second application. For example, a web browser application may generate a content selection request in response to loading a web page having an embedded content tag. According to various implementations, the content selection request may include a logged-out cookie that indicates whether or not the second application is currently logged into the account. For example, a user may log into her account using a stand-alone application and separately using a web browser application on the same device. In such a case, the web browser application may have a logged-in cookie that allows a content selection service to use account-related data to select content for the web browser (e.g., the browser's logged-in cookie indicates that at least one application on the device is logged into the account). The web browser may also have a logged-out cookie that includes data that indicates whether or not the web browser application itself is logged into the account (e.g., the logged-out cookie indicates that the specific web browser application is logged into the account).

Process 900 includes causing a logged-in cookie in the second application to be removed or deactivated (block 908). If the stored device identifier matches the device identifier in the content selection request, the logged-in cookie in the second application may be removed or deactivated to synchronize the states of the first and second applications. For example, a command may be sent to the second application to remove its logged-in cookie. In some implementations, the logged-in cookie may only be removed or deactivated if the second application is also logged out of the account. For example, a device identifier included with the content selection request, such as a logged-out cookie, may indicate whether or not the second application is currently logged into the account. In such a case, the content selection service may leave the logged-in cookie set within the second application, if the second application is still logged into the account. Thus, the second application's logged-in cookie may remain active so long as the second application is still logged into the account.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of setting a cookie on a device comprising:
    receiving, at a processor, a content selection request from a first application executing on the device, the content selection request including a first cookie indicating an authorization of the first application to use an online account;
    selecting, in response to the content selection request, third-party content for presentation within the first application, the third-party content selected based in part on information associated with the online account;
    providing an indication of the selected third-party content to the first application on the device;
    receiving, at the processor via a second application on the device, interaction data indicating an interaction with the third-party content within the first application and including the first cookie; and
    setting a second cookie in the second application based on a determination that the interaction data does not include the second cookie, the second cookie indicating authorization of the second application to use the online account.

2. The method of claim 1, further comprising:
    receiving, at the processor, an indication that the first application has been logged out of the online account; and
    causing, by the processor, the second cookie to be cleared from the second application on the device based on the first application having been logged out of the online account.

3. The method of claim 2, wherein the indication that the first application has been logged out of the online account includes a unique identifier for the device, the method further comprising:
    receiving, at the processor, a second content selection request from the second application on the device, and wherein the second cookie is cleared from the second application based on a determination that the second content selection request includes the unique identifier for the device.

4. The method of claim 3, wherein the unique identifier for the device is based in part on a hardware serial number of the device.

5. The method of claim 3, wherein the unique identifier for the device comprises a cookie.

6. The method of claim 1, wherein the online account is associated with at least one of: a social networking service, a navigation service, an online communication service, or a file storage service.

7. The method of claim 6, wherein the first application is a stand-alone application configured to access at least one of: the social networking service, the navigation service, the online communication service, or the file storage service.

8. The method of claim 7, wherein the second application comprises a web browser.

9. A system for setting a cookie on a device comprising a processor operable to:
 receive a content selection request from a first application executing on the device, the content selection request including a first cookie indicating authorization of the first application to use an online account;
 select, in response to the content selection request, third-party content for presentation within the first application, the third-party content selected based in part on information associated with the online account;
 provide an indication of the selected third-party content to the first application executing on the device;
 receive, via a second application on the device, data indicating interaction with the third-party content within the first application and including the first cookie; and
 set a second cookie in the second application based on a determination that the interaction data does not include the second cookie, the second cookie indicating authorization of the second application to use the online account.

10. The system of claim 9, wherein the processor is further operable to:
 receive an indication that the first application has been logged out of the online account; and
 cause the second cookie to be cleared from the second application on the device based on the first application having been logged out of the online account.

11. The system of claim 10, wherein the indication that the first application has been logged out of the online account includes a unique identifier for the device, the processor being further configured to receive a second content selection request from the second application on the device, and wherein the second cookie is cleared from the second application based on a determination that the second content selection request includes the unique identifier for the device.

12. The system of claim 11, wherein the unique identifier for the device is based in part on a hardware serial number of the device.

13. The system of claim 11, wherein the unique identifier for the device comprises a cookie.

14. The system of claim 9, wherein the online account is associated with at least one of: a social networking service, a navigation service, an online communication service, or a file storage service.

15. The system of claim 14, wherein the first application is a stand-alone application configured to access at least one of: the social networking service, the navigation service, the online communication service, or the file storage service.

16. The system of claim 15, wherein the second application comprises a web browser.

17. A computer-readable storage medium having instructions stored therein, the instructions being executable by a processor to cause the processor to perform operations comprising:
 receiving a content selection request from a first application executing on the device, the content selection request including a first cookie indicating authorization of the first application to use an online account;
 selecting, in response to the content selection request, third-party content for presentation within the first application, the third-party content selected based in part on information associated with the online account;
 providing an indication of the selected third-party content to the first application executing on the device;
 receiving, via a second application on the device, data indicating interaction with the third-party content within the first application and including the first cookie; and
 setting a second cookie in the second application based on a determination that the interaction data does not include the second cookie, the second cookie indicating authorization of the second application to use the online account.

18. The computer-readable storage medium of claim 17, wherein the online account is associated with at least one of: a social networking service, a navigation service, an online communication service, or a file storage service.

19. The computer-readable storage medium of claim 18, wherein the first application is a stand-alone application configured to access at least one of: the social networking service, the navigation service, the online communication service, or the file storage service.

20. The computer-readable storage medium of claim 19, wherein the second application comprises a web browser.

* * * * *